March 1, 1949.   L. REUSS   2,463,205
EAR CORN PROBE
Filed Dec. 6, 1946
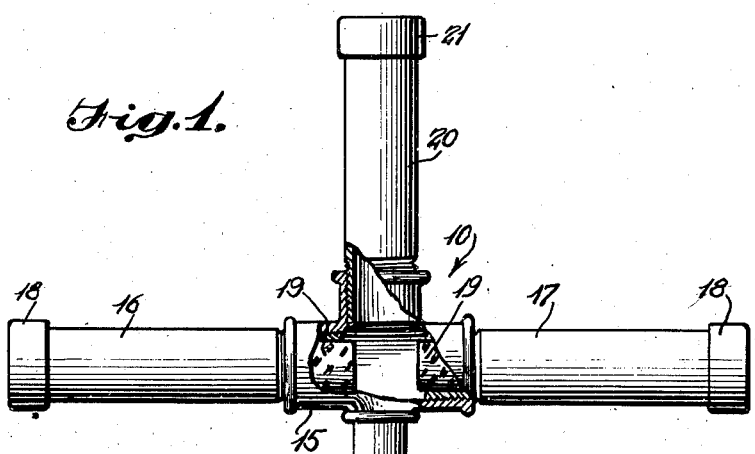
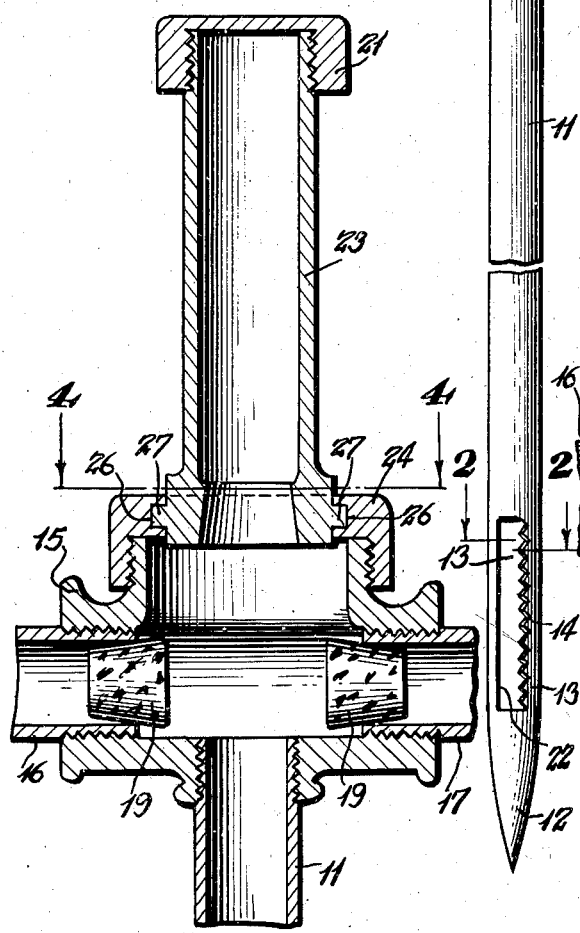
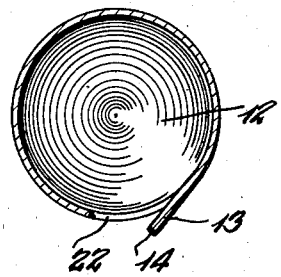
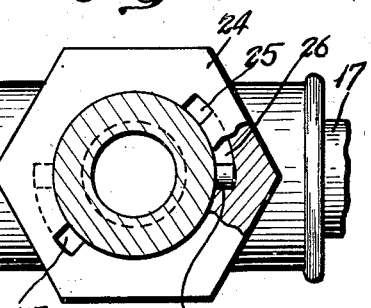
INVENTOR.
Louie Reuss.
BY Victor J. Evans & Co.
ATTORNEYS Patented Mar. 1, 1949

2,463,205

UNITED STATES PATENT OFFICE 2,463,205

EAR CORN PROBE

Louie Reuss, Herman, Minn.

Application December 6, 1946, Serial No. 714,399

1 Claim. (Cl. 73—425.2)

This invention relates to an ear corn probe that is used for the testing of ear corn stored in bulk in crib or bin.

An object of this invention is to provide a simple, convenient and easily operated probe that will efficiently procure a sample of shelled corn from a bulk of ear corn stored in bulk in a bin or crib, and at any desired location therein.

With the above and other objects in view, the invention consists of the novel details of construction, arrangement and combination of parts more fully hereinafter described, claimed and illustrated in the accompanying drawing in which:

Figure 1 is an elevational view partly in section of an embodiment of the invention;

Figure 2 is a sectional view on the line 2—2 of Figure 1;

Figure 3 is a modified form of the invention and

Figure 4 is a sectional view on the line 4—4 of Figure 3.

Referring more in detail to the drawing, the reference numeral 10 generally designates the ear corn probe forming an embodiment of the invention which comprises the hollow tubular body 11 forming the sampling portion of the probe. The body 11 is provided with a closed conical shaped pointed end 12 and a corn shelling rake 13, having a serrated vertical edge 14, struck out of the body 11 adjacent the pointed end 12 thereof.

Threadably connected to the upper end of the body 11, is a T coupling 15 in which is received in horizontal alined outwardly extending relation to each other, the tubular handles 16 and 17 respectively, and caps 18 close the outer ends of the handles.

The inner ends of the handles 16 and 17 are closed by corks 19, and threadably secured to the coupling 15 in vertical alinement with the body 11, is the hollow sampling tube 20 which is closed at its upper end by a cap 21.

In use, the probe is pushed into the bin or crib of bulk ear corn, and rotated by means of the handles 16 and 17 in a clockwise manner, the shelled corn will enter the vertical opening 22 formed by the struckout rake 13 and be forced up the body 11 into the sampling tube 20, which can then be unscrewed from the T coupling for the inspection of the shelled corn therein.

To expedite the removal of the sampling tube 23 shown in Figures 3 and 4, a collar 24, which may be hexagonal in shape, is threadably connected to the T coupling 15. The collar 24 is provided on its upper face with diametrically opposed cutouts 25 which communicate with arcuate shaped grooves 26 formed in the collar on opposite sides of the cutouts 25, and studs 27 formed on the lower end of the sampler will enter the cutouts 25 and upon a slight turn of the sampling tube 23 in a clockwise manner, the studs will enter the grooves 26 and be retained in the collar. A reverse movement of the sampling tube 23 will enable the tube to be removed for the inspection of the shelled corn therein.

There has thus been provided, a simple and easily operated probe that is devoid of sharp edges that will harm the operator thereof, and it is believed that from the foregoing description, when taken in connection with the accompanying drawing, the novel design and detail of construction, as well as the manner of use and advantages of the invention will be readily apparent to those skilled in the art.

It is also to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described, comprising an elongated hollow tubular body, a closed conical shaped pointed end on said body, a T-shaped hollow connecting means on the opposite end of said body and having communication therewith, outwardly directed horizontally alined tubular handles connected to said means and having communication therewith, a vertically disposed tubular sampling tube detachably connected to said means and having communication therewith and with said body and said handles, caps removably secured to and closing the outer ends of said handles and said sampling tube, corks positioned in said means for closing the inner ends of said handles to prevent communication between said handles and said connecting means, a vertically disposed sample receiving slot adjacent to the pointed end of said body, a rake formed on the lower end of said body upwardly from said pointed end along the vertical longitudinal side of said slot, and said rake adapted to force shelled corn into the sample receiving slot in said body when said body is rotated.

LOUIE REUSS.

REFERENCES CITED

The following references are of record in the file of this patent:

UNITED STATES PATENTS

| Number | Name | Date |
|---|---|---|
| 185,024 | Gent | Dec. 5, 1876 |
| 2,184,472 | Sand | Dec. 26, 1939 |
| 2,346,220 | Kienzle et al. | Apr. 11, 1944 |

FOREIGN PATENTS

| Number | Country | Date |
|---|---|---|
| 101,550 | Switzerland | Oct. 16, 1923 |